US010621944B2

(12) United States Patent
Koide

(10) Patent No.: US 10,621,944 B2
(45) Date of Patent: *Apr. 14, 2020

(54) GATE VOLTAGE GENERATION CIRCUIT, TRANSISTOR SUBSTRATE AND DISPLAY DEVICE

(71) Applicant: Japan Display Inc., Tokyo (JP)

(72) Inventor: Gen Koide, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/220,136

(22) Filed: Dec. 14, 2018

(65) Prior Publication Data

US 2019/0122631 A1    Apr. 25, 2019

Related U.S. Application Data

(63) Continuation of application No. 15/384,563, filed on Dec. 20, 2016, now Pat. No. 10,192,512.

(30) Foreign Application Priority Data

Jan. 15, 2016    (JP) ................................. 2016-006001

(51) Int. Cl.
*G09G 3/36* (2006.01)
*G02F 1/1368* (2006.01)
(Continued)

(52) U.S. Cl.
CPC ......... *G09G 3/3696* (2013.01); *G09G 3/3648* (2013.01); *G09G 3/3677* (2013.01);
(Continued)

(58) Field of Classification Search
CPC ... G09G 3/3696; G09G 3/3648; G09G 3/3677
See application file for complete search history.

(56) References Cited

U.S. PATENT DOCUMENTS 5,450,025 A * 9/1995 Shay ................ H03K 19/00315
   326/81
5,936,433 A * 8/1999 Holloway .............. H03K 5/249
   327/74

(Continued)

FOREIGN PATENT DOCUMENTS

| JP | 2004-094197 A | 3/2004 |
| JP | 2007-052291 A | 3/2007 |
| JP | 2012-058502 A | 3/2012 |

OTHER PUBLICATIONS

Japanese Office Action dated Mar. 19, 2019 for the corresponding Japanese Patent Application No. 2016-006001, with English translation.

*Primary Examiner* — Ricardo Osorio
(74) *Attorney, Agent, or Firm* — Michael Best & Friedrich LLP

(57) ABSTRACT

A gate voltage generation circuit generates a gate voltage including a first voltage, a second voltage and a third voltage and supplies the gate voltage to a pixel transistor of a display device. The first voltage is a voltage for opening the pixel transistor. The second voltage is lower than the first voltage and is a voltage for closing the pixel transistor. The third voltage is an intermediate voltage between the first voltage and the second voltage. The voltage rises by way of the intermediate voltage at the time of rising from the second voltage to the first voltage.

12 Claims, 13 Drawing Sheets

(51) Int. Cl.
 *G02F 1/1343* (2006.01)
 *G02F 1/1362* (2006.01)
(52) U.S. Cl.
 CPC ...... *G02F 1/1368* (2013.01); *G02F 1/134309* (2013.01); *G02F 1/136286* (2013.01); *G09G 2310/0286* (2013.01)

(56) References Cited

U.S. PATENT DOCUMENTS

| | | | | |
|---|---|---|---|---|
| 6,147,550 | A * | 11/2000 | Holloway | G05F 3/205 |
| | | | | 327/538 |
| 8,184,079 | B2 * | 5/2012 | Park | G09G 3/3677 |
| | | | | 345/87 |
| 9,103,724 | B2 * | 8/2015 | Aoki | G01J 1/44 |
| 9,317,397 | B2 * | 4/2016 | Narutani | G06F 11/3664 |
| 9,449,703 | B1 * | 9/2016 | Roy | G11C 16/30 |
| 9,848,149 | B2 * | 12/2017 | Aoki | G01J 1/44 |
| 10,192,512 | B2 * | 1/2019 | Koide | G09G 3/3677 |
| 2003/0040149 | A1 * | 2/2003 | Kasai | G05F 3/262 |
| | | | | 438/200 |
| 2004/0048069 | A1 * | 3/2004 | Yamada | G09G 3/325 |
| | | | | 428/411.1 |
| 2011/0063892 | A1 * | 3/2011 | Kajigaya | G11C 7/065 |
| | | | | 365/149 |
| 2015/0009763 | A1 * | 1/2015 | Kumazaki | G11C 16/30 |
| | | | | 365/185.21 |
| 2015/0349637 | A1 * | 12/2015 | Lu | H03K 19/01721 |
| | | | | 323/271 |

* cited by examiner

GATE VOLTAGE GENERATION CIRCUIT, TRANSISTOR SUBSTRATE AND DISPLAY DEVICE

CROSS-REFERENCE TO RELATED APPLICATIONS

This application is a continuation of U.S. patent application Ser. No. 15/384,563 filed on Dec. 20, 2016. Further, this application claims priority from Japanese patent application JP 2016-006001 filed on Jan. 15, 2016, the entire contents of which are hereby incorporated by reference into this application.

TECHNICAL FIELD OF THE INVENTION

The present invention relates to a gate voltage generation circuit, a transistor substrate and a display device, and relates to a technique effectively applied to, for example, a gate voltage generation circuit for supplying a gate voltage to a pixel transistor of a display device, a transistor substrate provided with this gate voltage generation circuit and a display device provided with this transistor substrate.

BACKGROUND OF THE INVENTION

There is a display device in which an image is displayed by supplying scanning signals through a plurality of gate lines and pixel signals through a plurality of source lines to a plurality of pixels provided in a display region. For such a display device, downsizing of the display device and enlargement of the display region have been required. Thus, downsizing of the transistor and circuit has been required so as to reduce the width of a peripheral region located outside the display region.

In the display region of the display device, the plurality of pixels include pixel transistors and are formed by crossing the plurality of gate lines and the plurality of source lines. Further, a gate driver for supplying scanning signals to the plurality of pixels and a source driver for supplying pixel signals to the plurality of pixels are disposed in the peripheral region of the display device.

For example, as techniques relating to the gate driver of a display device, Japanese Patent Application Laid-Open Publication No. 2012-58502 (Patent Document 1) and Japanese Patent Application Laid-Open Publication No. 2007-52291 (Patent Document 2) can be cited. Patent Document 1 describes a technique for applying a ground voltage as an intermediate voltage during switching between a high voltage and a low voltage in a shift register circuit of the gate driver. Patent Document 2 describes a technique in which, when a gate pulse is to be applied, a certain amount of time at an intermediate potential is secured for a period before the gate line voltage reaches a voltage at which the pixel transistor is turned off, at the time of the pulse falling that is a process in which the voltage of a gate pulse changes to the non-selective state from the selective state.

SUMMARY OF THE INVENTION

In the display device described above, as the frame is narrowed by reducing the width of the peripheral region (referred to also as a frame region) located outside the display region, the influence of the layout area of the gate driver on the frame size has been increasing. In particular, the influence of the size of the transistor in the output section for directly driving the gate line is large and thus the countermeasure for this has been desired.

An object of the present invention is to provide a technique for reducing the circuit area by downsizing the transistor.

A gate voltage generation circuit according to one aspect of the present invention is a gate voltage generation circuit for generating a gate voltage including a first voltage, a second voltage and a third voltage and supplying the gate voltage to a pixel transistor of a display device. The first voltage is a voltage for opening the pixel transistor. The second voltage is lower than the first voltage and is a voltage for closing the pixel transistor. The third voltage is an intermediate voltage between the first voltage and the second voltage. Further, the voltage rises by way of the intermediate voltage at the time of rising from the second voltage to the first voltage.

Also, according to another aspect of the present invention, a transistor substrate may be provided with the gate voltage generation circuit described above. The transistor substrate includes: a plurality of source lines and a plurality of gate lines formed in a display region; a pixel region formed by crossing the source lines and the gate lines; and a peripheral region outside the display region. The transistor substrate further includes: a gate selection circuit formed in the peripheral region and connected to the gate line of the pixel transistor; a first transistor constituting the gate selection circuit; and a first source electrode and a first drain electrode constituting the first transistor. Further, the pixel transistor is formed in the pixel region, the gate voltage generation circuit is formed in the peripheral region, the first source electrode is electrically connected to the gate voltage generation circuit, and the first drain electrode is electrically connected to the gate line.

Also, according to another aspect of the present invention, a display device may be provided with the transistor substrate described above.

BRIEF DESCRIPTIONS OF THE DRAWINGS

DESCRIPTIONS OF THE PREFERRED EMBODIMENTS

Figure 1:
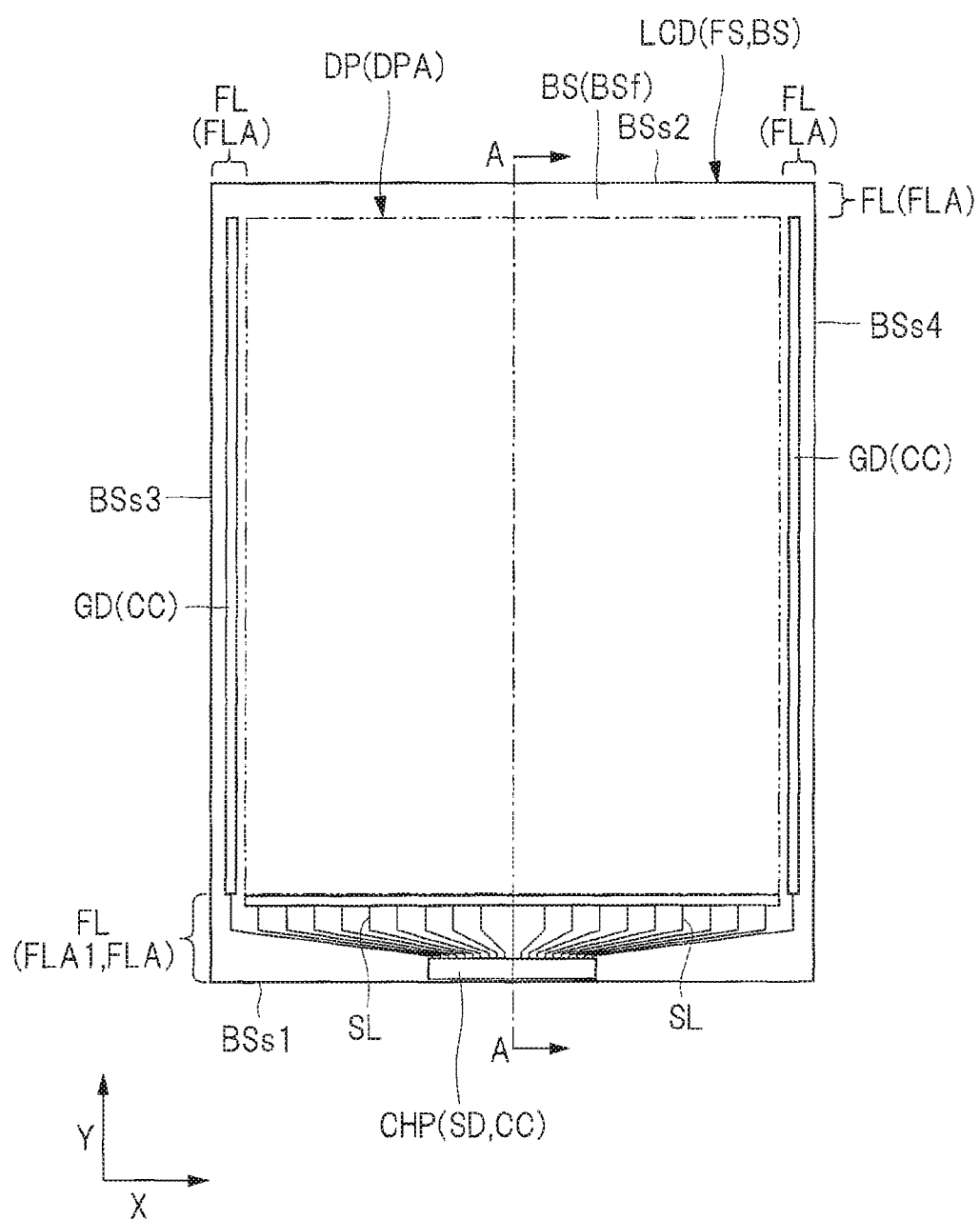
FIG. 1 is a plan view showing an example of a display device of an embodiment.

Hereinafter, an embodiment of the present invention will be described with reference to drawings.

Note that the disclosure is mere an example, and it is a matter of course that any alteration that is easily made by a person having an ordinary skill in the art while keeping a gist of the present invention is included in the present invention. In addition, the drawings schematically illustrate a width, a thickness, a shape and the like of each portion as compared to actual aspects in order to make the description clearer, but the drawings are mere examples and do not limit the interpretation of the present invention.

In addition, the same reference characters are applied to the same elements as those described in relation to the foregoing drawings in the present specification and the respective drawings, and detailed descriptions thereof will be appropriately omitted in some cases. Also, in some drawings used in the following embodiment, hatching is omitted even in a cross-sectional view so as to make the drawings easy to see. In addition, hatching is used even in a plan view so as to make the drawings easy to see.

The technique to be described in the following embodiment is widely applicable to display devices provided with a mechanism in which signals are supplied from a periphery of a display region to a plurality of elements provided in the display region having a display function layer. Various display devices such as a liquid crystal display device and an organic EL (Electro-Luminescence) display device can be cited as the above-mentioned display devices. In the embodiment described below, a liquid crystal display device is taken as a representative example of the display device.

Further, the liquid crystal display device is roughly classified into the following two modes depending on an application direction of an electric field for changing orientation of liquid crystal molecules of a liquid crystal layer serving as the display element layer. That is, there is a so-called vertical electric field mode as a first classification, in which the electric field is applied in a thickness direction (or out-of-plane direction) of the display device. The vertical electric field mode includes, for example, a twisted nematic (TN) mode, a vertical alignment (VA) mode and the like. In addition, there is a so-called horizontal electric field mode as a second classification, in which the electric field is applied in a planar direction (or in-plane direction) of the display device. The horizontal electric field mode includes, for example, an in-plane switching (IPS) mode, a fringe field switching (FFS) mode which is one of the IPS modes and the like. The above-mentioned vertical electric field mode includes the case in which the electric field is generated in an oblique direction between the thickness direction and the planar direction of the display device. The technique to be described hereinafter can be applied to any one of the vertical electric field mode and the horizontal electric field mode, but a display device of the horizontal electric field mode will be described as an example in the embodiment.

EMBODIMENT

<Configuration of Display Device>

Figure 2:
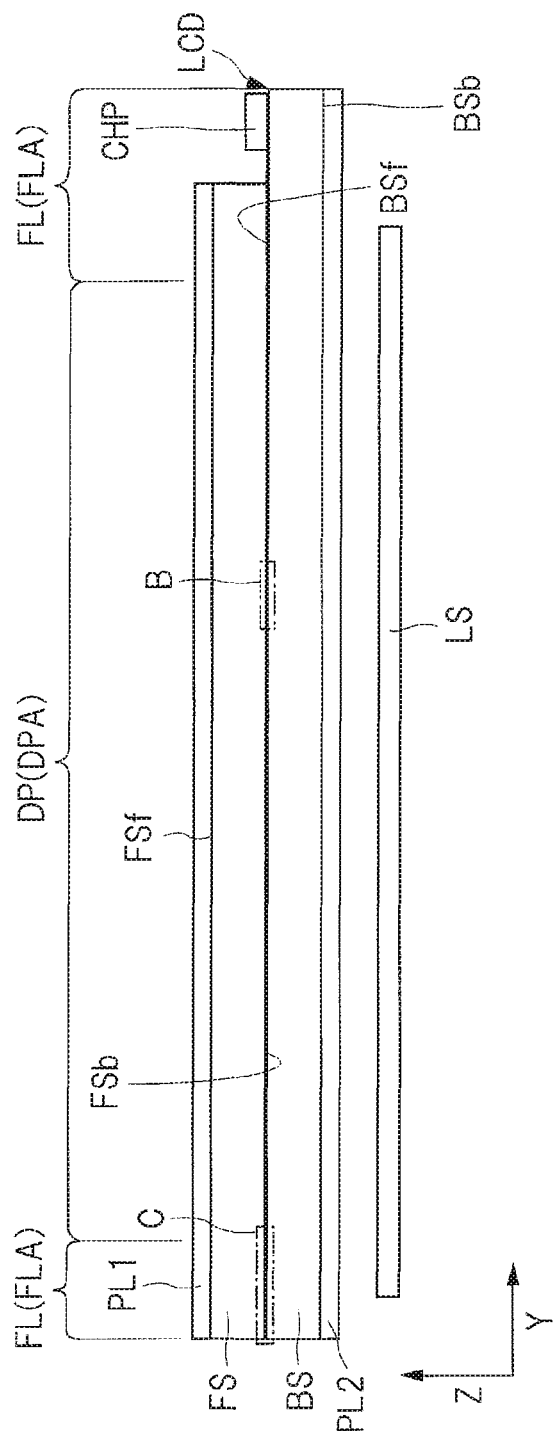
FIG. 2 is a cross-sectional view taken along a line A-A in FIG. 1.
Figure 3:
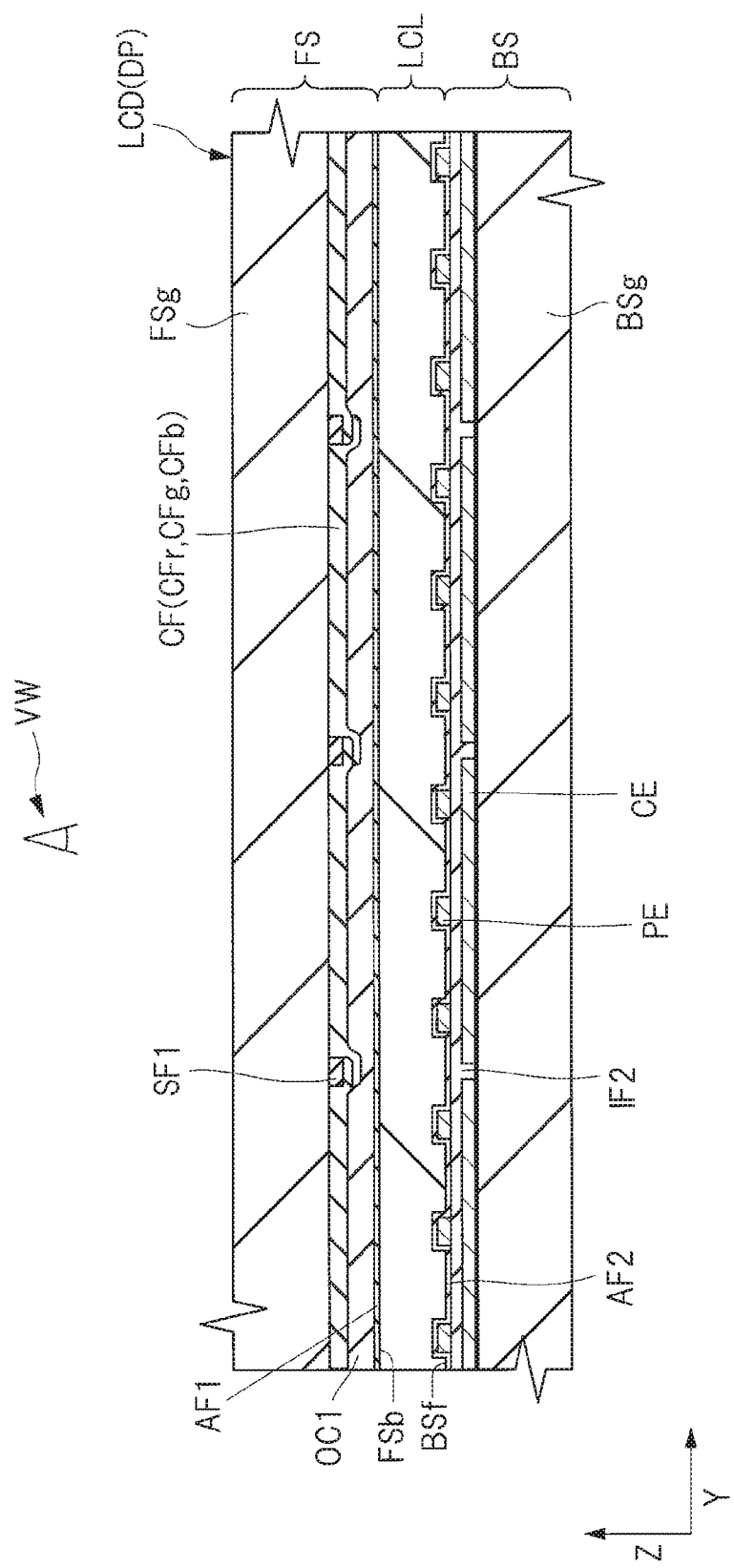
FIG. 3 is an enlarged cross-sectional view of a portion B in FIG. 2.
Figure 4:
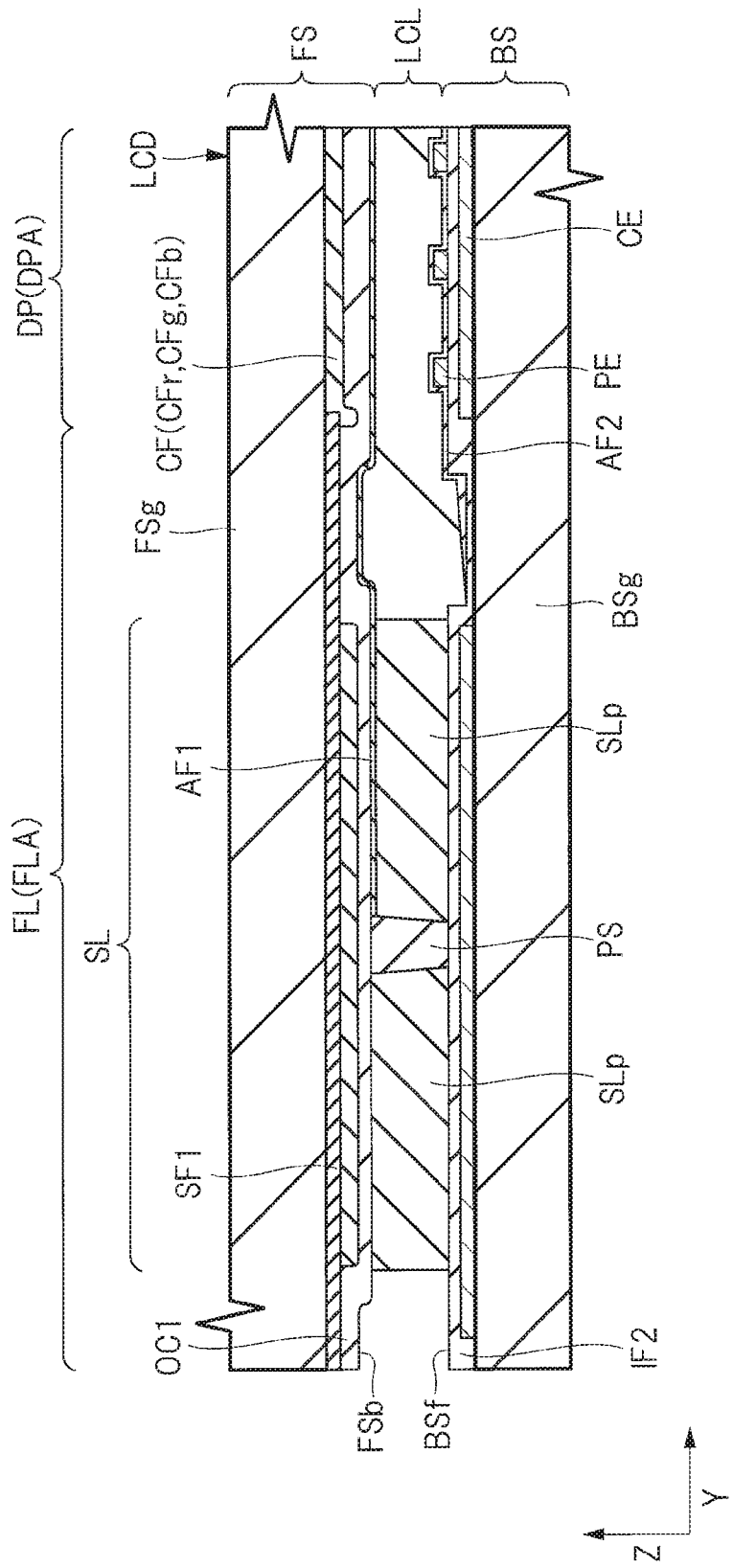
FIG. 4 is an enlarged cross-sectional view of a portion C in FIG. 2.

First, a configuration of the display device will be described. FIG. 1 is a plan view showing an example of a display device of an embodiment. FIGS. 2 to 4 are cross-sectional views each showing an example of the display device of the embodiment. FIG. 2 is a cross-sectional view taken along a line A-A in FIG. 1. FIG. 3 is an enlarged cross-sectional view of a portion B in FIG. 2. FIG. 4 is an enlarged cross-sectional view of a portion C in FIG. 2.

In FIG. 1, the outline of a display region DPA is represented by two-dot chain lines in order to make the boundary between the display region DPA and a frame region (peripheral region) FLA in a plan view more visible. Further, a plurality of source lines SL shown in FIG. 1 extend from the frame region FLA to the display region DPA. However, the source lines SL are not illustrated in the display region DPA for easy viewing in FIG. 1. Further, although FIG. 2 is a cross-sectional view, hatching is omitted for easy viewing.

As shown in FIG. 1, the display device LCD of the present embodiment has a display section DP for displaying an image. The region located on a side of a front surface BSf (see FIG. 2) corresponding to a display surface side of a substrate BS and provided with the display section DP is the display region DPA. Also, the display device LCD has a frame section (peripheral section) FL which is the frame-shaped part around the display section DP in a plan view and does not display an image. The region provided with the frame section FL corresponds to the frame region FLA. Namely, the frame region FLA is a frame-shaped region around the display region DPA, but the shape thereof is not limited to the frame shape.

Note that the expression "in a plan view" in the specification of the present application means the state viewed from the direction vertical to the front surface BSf of the substrate BS.

Further, the display device LCD has a structure in which a liquid crystal layer serving as a display function layer is formed between a pair of substrates which are arranged opposite to each other. Namely, as illustrated in FIG. 2, the display device LCD includes a substrate FS on a display surface side, a substrate BS positioned on the opposite side of the display surface side, and a liquid crystal layer LCL (see FIG. 3) arranged between the substrate FS and the substrate BS. The liquid crystal layer LCL faces the display region DPA.

The two directions that cross each other, preferably that are perpendicular to each other in the front surface BSf (see FIG. 2) of the substrate BS are referred to as a Y-axis direction and an X-axis direction. At this time, the substrate BS shown in FIG. 1 has a side BSs1 extending in the X-axis direction, a side BSs2 extending in the X-axis direction in parallel with the side BSs1, a side BSs3 extending in the Y-axis direction crossing the X-axis direction, preferably crossing perpendicularly to the X-axis direction, and a side BSs4 extending in the Y-axis direction in parallel with the side BSs3 in a plan view. The distances to the display section DP from the sides BSs2, BSs3 and BSs4 of the substrate BS shown in FIG. 1 are almost equal to one another and are shorter than the distance to the display section DP from the side BSs1.

Hereinafter, when mentioning a periphery of the substrate BS in the specification of the present application, it means any one of the sides BSs1, BSs2, BSs3 and BSs4 constituting the outer frame of the substrate BS. Further, when simply mentioning a periphery, it means the periphery of the substrate BS. Further, the periphery of the substrate BS may be referred to as the end of the substrate BS in some cases.

The display section DP has pixels Px (see FIG. 5 to be described later) as a plurality of display elements. Namely, the plurality of pixels Px are provided in the display region DPA. The plurality of pixels Px are arranged in matrix in the X-axis direction and the Y-axis direction. In the present embodiment, each of the plurality of pixels Px has a thin film transistor (TFT, pixel transistor) formed in the display region DPA on the side of the front surface BSf of the substrate BS. Note that the pixel transistor means a transistor formed in the pixel region. When a plurality of transistors are present in the pixel region, it means any one of the transistors.

The substrate BS of the display device LCD has a plurality of gate lines GL1 to GLm (GL) and a plurality of source lines SL1 to SLn (SL) as described later with reference to FIG. 5. Each of the plurality of gate lines GL is electrically connected to the plurality of pixels PX arranged in the X-axis direction and each of the plurality of source lines SL is electrically connected to the plurality of pixels Px arranged in the Y-axis direction as described later with reference to FIG. 5.

Further, the display device LCD has a circuit section CC. The circuit section CC includes a gate driver GD and a source driver SD. The gate driver GD is electrically connected to the plurality of pixels Px through the plurality of gate lines GL, and the source driver SD is electrically connected to the plurality of pixels Px through the plurality of source lines SL.

In the example illustrated in FIG. 1, a semiconductor chip CHP is provided in a frame region FLA1 that is a part of the frame region FLA between the side BSs1 of the substrate BS and the display section DP. The source driver SD is provided in the semiconductor chip CHP. Thus, the source driver SD is provided in the frame region FLA1 that is a region on the side of the front surface BSf of the substrate BS and is a region arranged on the negative side in the Y-axis direction with respect to the display region DPA.

Note that the expression "negative side in the Y-axis direction" in the specification of the present application means the side opposite to the side to which the arrow representing the Y-axis direction extends in the figure.

Also, the semiconductor chip CHP may be provided in the frame region FLA1 by using a so-called chip on glass (COG) technique, or alternately, may be disposed outside the substrate BS and connected to the display device LCD through flexible printed circuits (FPC). A detailed arrangement of the source lines SL will be described later with reference to FIG. 5.

The display device LCD has a seal part SL formed on the peripheral side of the liquid crystal layer LCL in the frame section FL as shown in FIG. 4. The seal part SL is formed so as to continuously surround the circumference of the display section DP, and the substrates FS and BS are adhered and fixed by a sealant SLp provided in the seal part SL. In this manner, by providing the seal part SL around the display section DP, the liquid crystal layer LCL serving as a display function layer can be sealed. Note that the display function layer is not limited to this, and may be an organic EL layer described above or may control the light transmission amount by a micro electro mechanical system (MEMS) shutter.

As shown in FIG. 3, the display device LCD has a plurality of pixel electrodes PE and common electrodes CE disposed between the substrates FS and BS. Since the display device LCD of the present embodiment is a display device of the lateral electric field mode as described above, each of the plurality of pixel electrodes PE and common electrodes CE are formed on the substrate BS.

The substrate BS shown in FIG. 3 includes an insulating base material BSg made of a glass substrate or the like, and circuits for the image display are mainly formed on the base material BSg. The substrate BS has the front surface BSf located on the side closer to the substrate FS and a back surface BSb on the side opposite thereto (see FIG. 2). Further, display elements such as thin film transistors (TFT) and the plurality of pixel electrodes PE are formed in matrix on the side of the front surface BSf of the substrate BS. The substrate BS is referred to as a TFT substrate or a transistor substrate because TFTs are formed thereon.

Since the example illustrated in FIG. 3 shows the display device LCD of the lateral electric field mode (specifically, FFS mode), the common electrodes CE are formed on the front surface side of the base material BSg of the substrate BS, and are covered with an insulating film IF2. Further, the plurality of pixel electrodes PE are formed on the insulating film IF2 on the side closer to the substrate FS so as to face the common electrodes CE via the insulating film IF2.

In addition, the substrate FS illustrated in FIG. 3 is a substrate obtained by forming a color filter CF that forms an image of color display on a base material FSg made of a glass substrate or the like, and has a front surface FSf (see FIG. 2) on the display surface side and a back surface FSb on the side opposite to the front surface FSf. When being distinguished from the above-mentioned substrate BS serving as a TFT substrate on which the TFTs are formed, the substrate on which the color filter CF is formed like the substrate FS is referred to as a color filter substrate or an opposed substrate because the substrate is opposed to the TFT substrate via a liquid crystal layer. As a modification example of the configuration in FIG. 3, a configuration in which the color filter CF is provided on the substrate BS serving as a TFT substrate may be employed.

Also, the liquid crystal layer LCL that forms a display image by applying a voltage for display between the pixel electrode PE and the common electrode CE is provided between the substrates FS and BS. The liquid crystal layer LCL modulates the light passing therethrough in accordance with the state of the applied electric field.

<Equivalent Circuit of Display Device>

Next, an equivalent circuit of the display device will be described with reference to FIG. 5. FIG. 5 is a diagram showing an example of the equivalent circuit of the display device of the embodiment.

Figure 5:
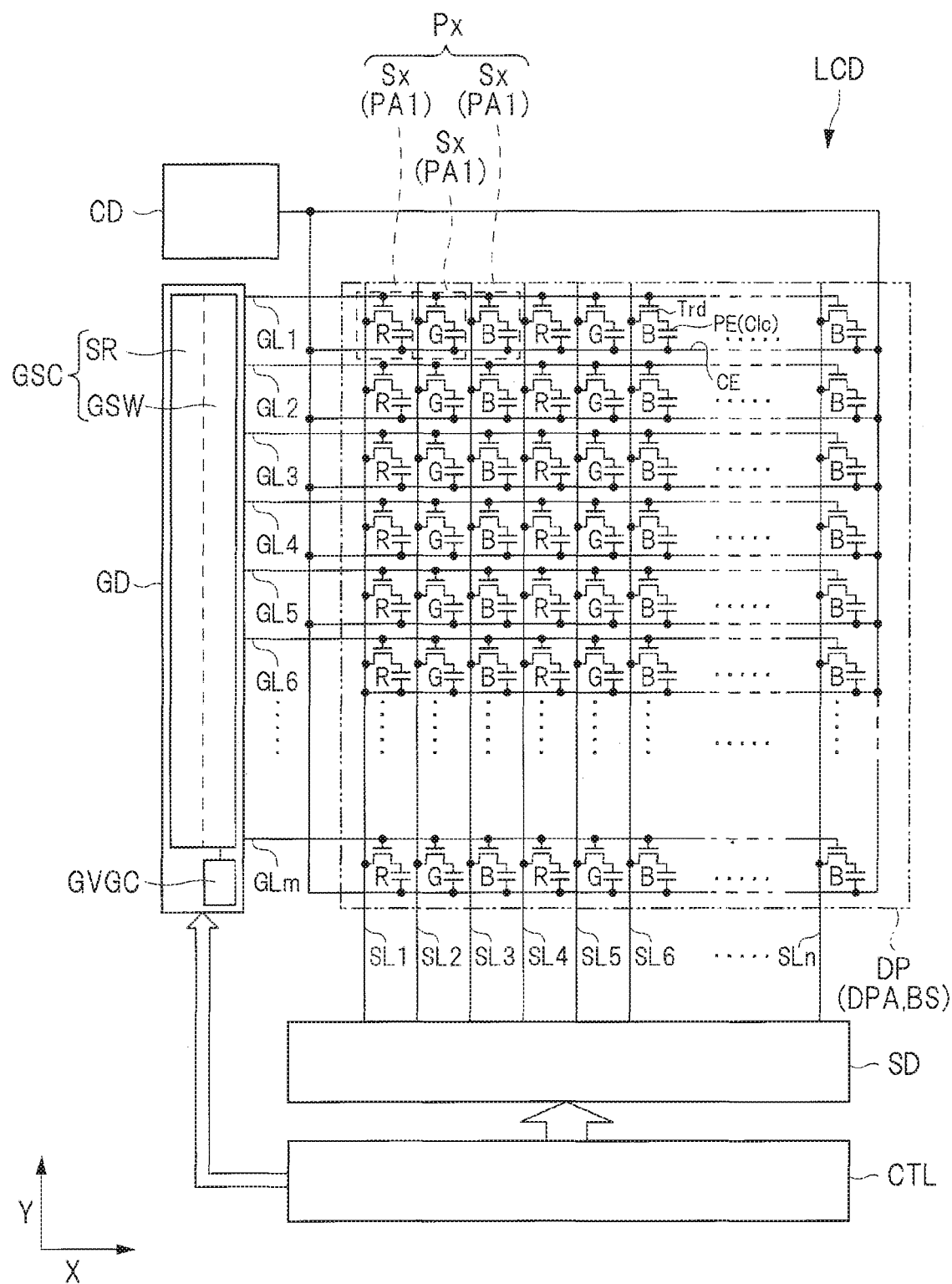
FIG. 5 is a diagram showing an example of an equivalent circuit of the display device of the embodiment.

As shown in FIG. 5, the display section DP of the display device LCD has the plurality of pixels Px. The plurality of pixels Px are provided on the substrate BS in the display region DPA and are arranged in matrix in the X-axis direction and the Y-axis direction in a plan view.

The substrate BS (transistor substrate) of the display device LCD has the plurality of gate lines GL1 to GLm and the plurality of source lines SL1 to SLn. The plurality of gate lines GL1 to GLm are provided on the substrate BS (see FIG. 2 for example) in the display region DPA, extend in the X-axis direction, and are arranged in the Y-axis direction. The plurality of source lines SL1 to SLn are provided on the substrate BS in the display region DPA, extend in the Y-axis direction, and are arranged in the X-axis direction. The plurality of gate lines GL1 to GLm and the plurality of source lines SL1 to SLn cross each other. Note that the gate lines GL1 to GLm are referred to also as scanning lines and the source lines SL1 to SLn are referred to also as signal lines. The gate lines GL1 to GLm may be generically called also as the gate lines GL and the source lines SL1 to SLn may be generically called also as the source lines SL.

Each of the plurality of pixels Px includes a sub-pixel Sx displaying each of colors of red (R), green (G) and blue (B). Each of the sub-pixels Sx is placed in a region surrounded by two neighboring gate lines GL and two neighboring source lines SL, but other configurations are also available.

Each sub-pixel Sx has a pixel transistor Trd made of a thin film transistor, the pixel electrode PE connected to the drain electrode of the pixel transistor Trd and the common electrode CE opposed to the pixel electrode PE across the liquid crystal layer. In FIG. 5, a liquid crystal capacity equivalently representing a liquid crystal layer and a retentive capacity formed between the common electrode CE and the pixel electrode PE are referred to as a capacity Clc. Note that the drain electrode and source electrode of the thin film transistor are exchanged appropriately depending on the polarity of potential.

When the region where the sub-pixel Sx is formed is referred to as a pixel region PA1, the display region DPA includes a plurality of pixel regions PA1. The pixel region PA1 is formed by crossing the plurality of gate lines GL1 to GLm and the plurality of source lines SL1 to SLn.

The circuit section CC (see FIG. 1) of the display device LCD has the source driver SD, the gate driver GD, a control circuit CTL and a common electrode drive circuit CD.

Each of the source electrodes of the pixel transistors Trd of the plurality of sub-pixels Sx arranged in the Y-axis direction is connected to the source lines SL1 to SLn. Further, each of the plurality of source lines SL1 to SLn is connected to the source driver SD.

Each of the gate electrodes of the pixel transistors Trd of the plurality of sub-pixels Sx arranged in the X-axis direction is connected to the gate lines GL1 to GLm. Further, each of the plurality of gate lines GL1 to GLm is connected to the gate driver GD.

The control circuit CTL controls the source driver SD, the gate driver GD and the common electrode drive circuit CD on the basis of display control signals such as display data, clock signals and display timing signals transmitted from the outside of the display device.

The control circuit CTL appropriately converts display data and display control signals supplied from the outside in accordance with arrangement of the sub-pixels of the display device, the display method, presence or absence of an RGB switch (not illustrated), presence or absence of a touch panel (not illustrated) and the like and outputs the converted data and signals to the source driver SD, the gate driver GD and the common electrode drive circuit CD.

As shown in FIG. 5, in the display device LCD, the plurality of source lines SL1 to SLn and the plurality of gate lines GL1 to GLm are formed in the display region DPA, and the pixel transistor Trd is positioned at the intersection part of each of the source lines SL1 to SLn and each of the gate lines GL1 to GLm. In the display region DPA, the region formed by crossing each of the source lines SL1 to SLn and each of the gate lines GL1 to GLm is referred to also as a pixel region. There is a peripheral region (frame region FLA) outside the display region DPA. The gate driver GD connected to the gate lines GL1 to GLm of the pixel transistors Trd is disposed in the peripheral region. The gate driver GD has a gate selection circuit GSC and a gate voltage generation circuit GVGC to be described later.

<Gate Selection Circuit>

Figure 6A:
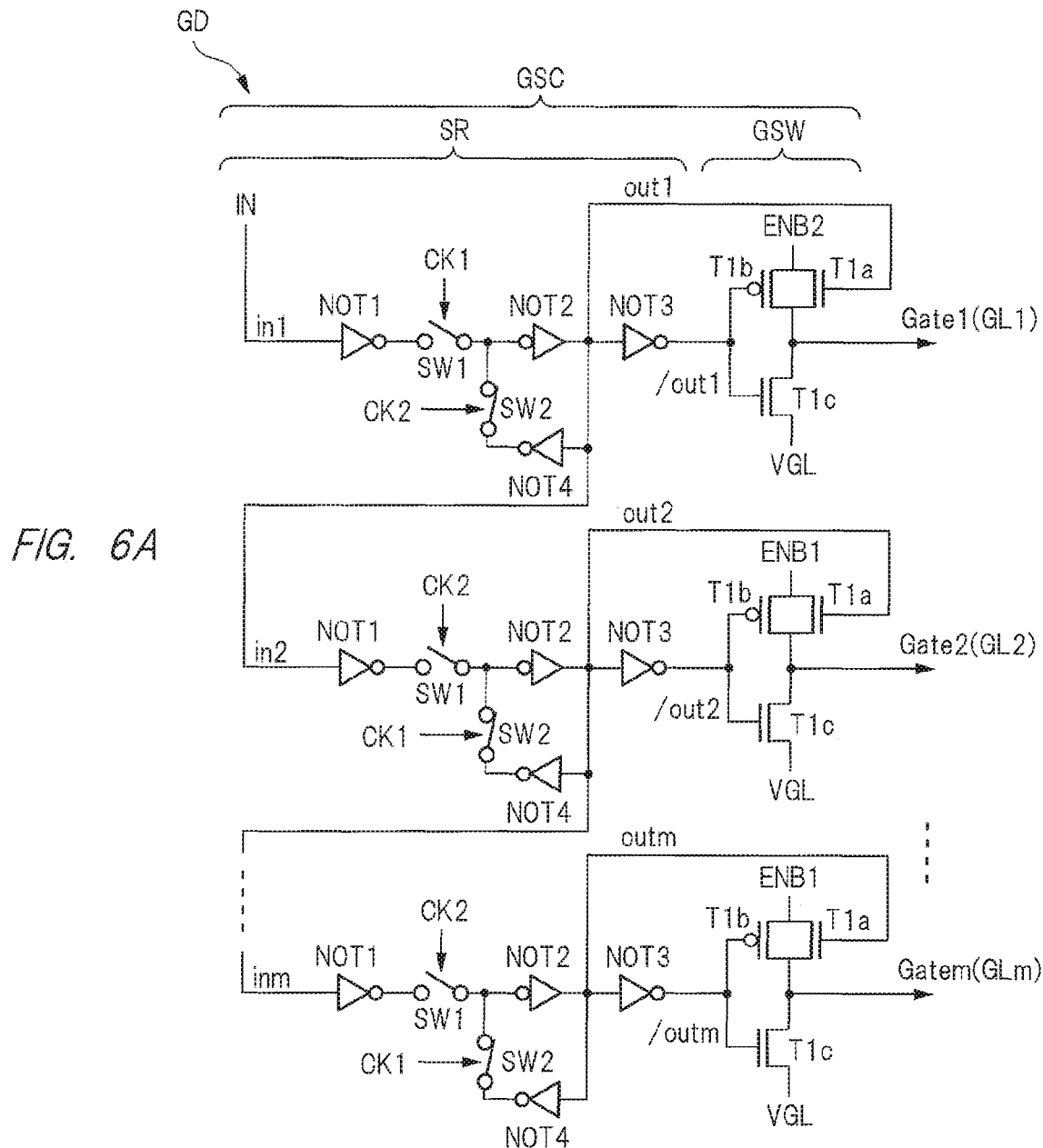
FIG. 6A is a circuit diagram showing an example of a gate selection circuit of the embodiment.
Figure 6B:
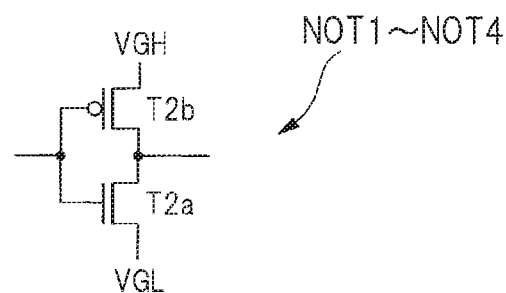
FIG. 6B is a circuit diagram showing an example of a gate selection circuit of the embodiment.
Figure 7:
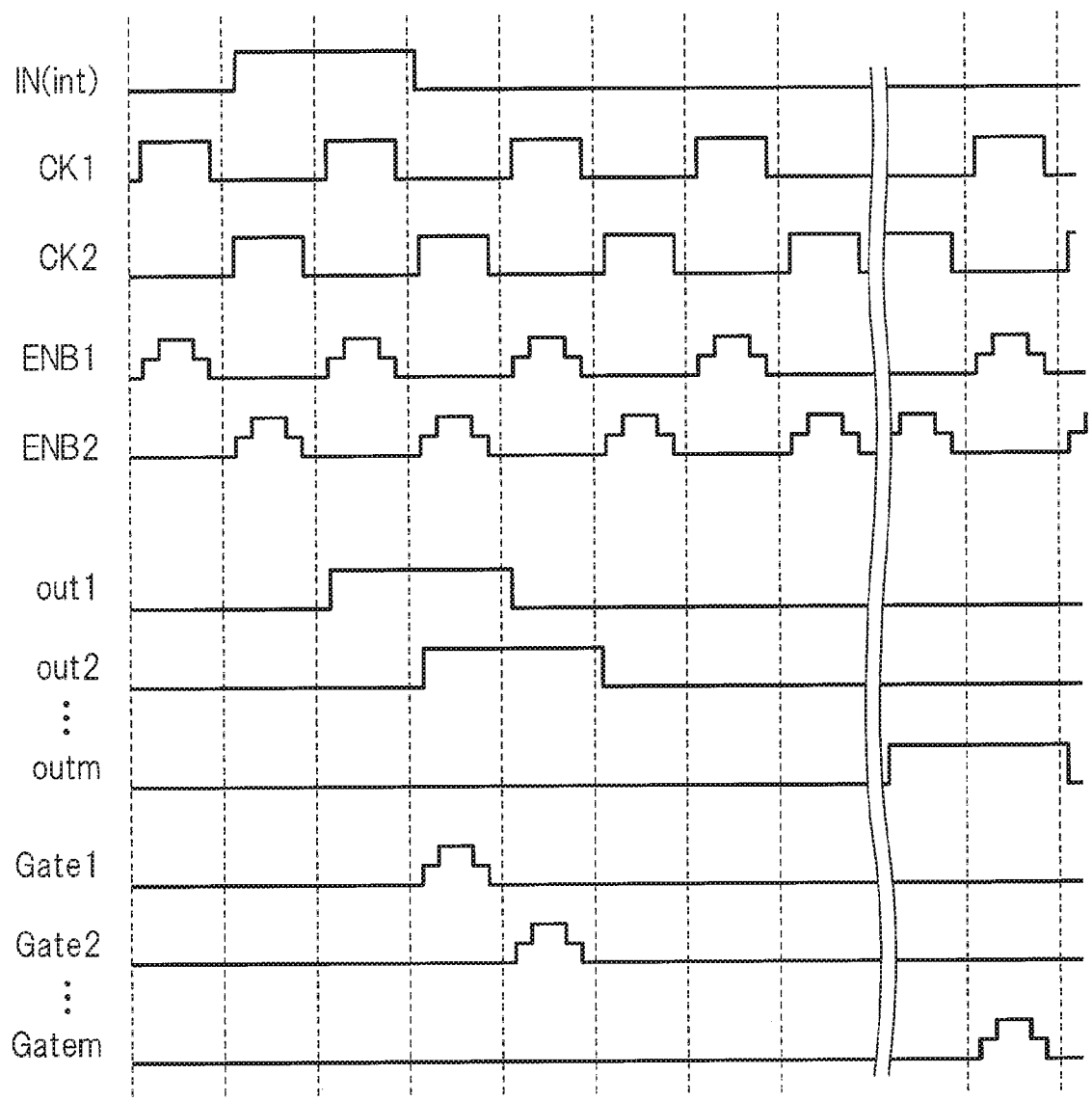
FIG. 7 is a timing chart showing an example of an operation of the gate selection circuit of the embodiment.

Next, a circuit configuration and an operation of the gate selection circuit will be described with reference to FIGS. 6A, 6B and 7. FIGS. 6A and 6B are circuit diagrams showing an example of the gate selection circuit of the embodiment. FIG. 7 is a timing chart showing an example of the operation of the gate section circuit of the embodiment.

The gate selection circuit GSC is a circuit which is included in the gate driver GD, is connected to the gate lines GL (GL1 to GLm) of the pixel transistors Trd of the display device, and supplies scanning signals (gate voltages) to the pixel transistors Trd through the gate lines GL.

The gate selection circuit GSC includes a gate switch circuit GSW connected to the gate lines GL of the pixel transistors Trd and a shift register circuit SR for sequentially scanning the gate switch circuit GSW.

The gate switch circuit GSW is provided with a plurality of transistor groups (equal to the number of gate lines) each including a first-a transistor T1$a$, a first-b transistor T1$b$ and a first-c transistor T1$c$. For example, the first transistor group corresponds to the first gate line GL1, the second transistor group corresponds to the second gate line GL2, and subsequently the m-th transistor group corresponds to the m-th gate line GLm.

Among the first-a transistor T1$a$, the first-b transistor T1$b$ and the first-c transistor T1$c$, the first-a transistor T1$a$ and the first-c transistor T1$c$ are n-channel MOSFETs and the first-b transistor T1$b$ is a p-channel MOSFET. Each of the first-a transistor T1$a$, the first-b transistor T1$b$ and the first-c transistor T1$c$ has a gate electrode, a source electrode, a drain electrode and a channel opposed to the gate electrode. The first-a transistor T1$a$, the first-b transistor T1$b$ and the first-c transistor T1$c$ are generically called also as first transistors.

For example, in the first-a transistor T1$a$ in the first transistor group, the gate electrode is connected to an output terminal (out1) of the shift register circuit SR, the source electrode is connected to a gate signal ENB2 of the gate voltage generation circuit GVGC, and the drain electrode is connected to the drain electrode of the first-c transistor T1$c$. In the first-b transistor T1$b$, the gate electrode is connected to an output terminal (/out1) of the shift register circuit SR, the source electrode is connected to the gate signal ENB2 of the gate voltage generation circuit GVGC, and the drain electrode is connected to the drain electrode of the first-c transistor T1$c$. In the first-c transistor T1$c$, the gate electrode is connected to the output terminal (/out1) of the shift register circuit SR, the source electrode is connected to a second voltage VGL, and the drain electrode is connected to the drain electrode of the first-a transistor T1$a$. The drain electrodes of the first-a transistor T1$a$, the first-b transistor T1$b$ and the first-c transistor T1$c$ serve as an output terminal of a gate selection signal Gate1 which is an output of the gate selection circuit GSC, and are electrically connected to the first gate line GL1.

Also in the second transistor group, the first-a transistor T1$a$, the first-b transistor T1$b$ and the first-c transistor T1$c$ are connected to each other, and further connected to the shift register circuit SR and the gate voltage generation circuit GVGC in the same manner. However, in the second transistor group, the gate electrodes of the first-a transistor T1a, the first-b transistor T1b and the first-c transistor T1c are connected to output terminals (out2 and /out2) of the shift register circuit SR, and the source electrodes of the first-a transistor T1a and the first-b transistor T1b are connected to a gate signal ENB1 of the gate voltage generation circuit GVGC. Then, the drain electrodes of the first-a transistor T1a, the first-b transistor T1b and the first-c transistor T1c serve as an output terminal of a gate selection signal Gate2 that is an output of the gate selection circuit GSC, and are electrically connected to the second gate line GL2.

Similarly, also in the third to m-th transistor groups, the drain electrodes of the first-a transistor T1a, the first-b transistor T1b and the first-c transistor T1c serve as output terminals of gate selection signals Gate3 to Gatem that are outputs of the gate selection circuit GSC, and are electrically connected to the third to m-th gate lines GL3 to GLm.

The shift register circuit SR is provided with a plurality of circuit groups (equal to the number of the gate lines) each including four logical NOT circuits NOT1, NOT2, NOT3 and NOT4 and two switch circuits SW1 and SW2. For example, the first circuit group corresponds to the first gate line GL1 and outputs output signals out1 and /out1 in response to an input signal in1, the second circuit group corresponds to the second gate line GL2 and outputs output signals out2 and /out2 in response to an input signal in2, and subsequently the m-th circuit group corresponds to the m-th gate line GLm and outputs output signals outm and /outm in response to an input signal inm.

For example, in the logical NOT circuit NOT1 in the first circuit group, the input signal in1 is input to its input terminal and its output terminal is connected to one terminal of the switch circuit SW1. In the logical NOT circuit NOT2, the other terminal of the switch circuit SW1 is connected to its input terminal and its output terminal is connected to the input terminal of the logical NOT circuit NOT3. In the logical NOT circuit NOT3, the output terminal of the logical NOT circuit NOT2 is connected to its input terminal and its output terminal is connected to the gate electrode of the first-b transistor T1b constituting the gate switch circuit GSW. In the logical NOT circuit NOT4, the output terminal of the logical NOT circuit NOT2 is connected to its input terminal and its output terminal is connected to the other terminal of the switch circuit SW2.

One terminal of the switch circuit SW1 is connected to the output terminal of the logical NOT circuit NOT1, and the other terminal thereof is connected to the input terminal of the logical NOT circuit NOT2. The on/off of the switch circuit SW1 is controlled by a clock signal CK1. One terminal of the switch circuit SW2 is connected to the other terminal of the switch circuit SW1 and the other terminal thereof is connected to the output terminal of the logical NOT circuit NOT4. The on/off of the switch circuit SW2 is controlled by a clock signal CK2.

The first circuit group outputs the output signals out1 and /out1 in response to the input signal in1, and these output signals out1 and /out1 serve as control signals for controlling the gate electrodes of the first-a transistor T1a, the first-b transistor T1b and the first-c transistor T1c in the first group of the gate switch circuit GSW.

Also in the second circuit group, the logical NOT circuits NOT1, NOT2, NOT3 and NOT4 and the switch circuits SW1 and SW2 are connected to each other in the same manner. However, in the second circuit group, the on/off of the switch circuit SW1 is controlled by the clock signal CK2, and the on/off of the switch circuit SW2 is controlled by the clock signal CK1. Further, the second circuit group outputs output signals out2 and /out2 in response to an input signal in2 that is the output signal out1 of the first circuit group, and these output signals out2 and /out2 serve as control signals for controlling the gate electrodes of the first-a transistor T1a, the first-b transistor T1b and the first-c transistor T1c in the second group of the gate switch circuit GSW.

Similarly, the third to m-th circuit groups also output the output signals out3 to outm and /out3 to /outm in response to the input signals in3 to inm that are the output signals out2 to out (m−1) of the preceding circuit groups, and these output signals out3 to outm and /out3 to /outm serve as control signals for controlling the gate electrodes of the first-a transistor T1a, the first-b transistor T1b and the first-c transistor T1c in the third to m-th groups of the gate switch circuit GSW.

In the connection of the gate selection circuit GSC mentioned above, the gate selection signals Gate1 to Gatem in response to input of an input signal IN (in1), the clock signals CK1 and CK2 and the gate signals ENB1 and ENB2 are output at the timing as shown in FIG. 7. The input signal IN (in1) is a scanning start signal, and when the scanning start signal is input to the shift register circuit SR on the first stage, this scanning start signal sequentially shifts in phase and the output signal (out) of the preceding stage becomes an input signal for the next stage. The clock signals CK1 and CK2 are pulse signals formed by repetition of the voltage levels of Hi and Lo, and have waveforms shifted by a half cycle from each other. The gate signals ENB1 and ENB2 are pulse signals, which are generated by the gate voltage generation circuit GVGC, rise from a second voltage VGL to a first voltage VGH by way of a third voltage GND at the time of the rising and fall from the first voltage VGH to the second voltage VGL by way of the third voltage GND at the time of the falling, and have waveforms shifted by a half cycle from each other. The gate selection signals Gate1 to Gatem are scanning signals to be supplied to the gate lines GL1 to GLm of a plurality of pixel transistors, respectively.

For example, the gate signal ENB2 is output as the gate selection signal Gate1 to the first gate line GL1 in the period when the output signal out1 of the shift register circuit SR is at the voltage level of Hi. Next, the gate signal ENB1 is output as the gate selection signal Gate2 to the second gate line GL2 in the period when the output signal out2 of the shift register circuit SR is at the voltage level of Hi. Subsequently, the gate signal ENB2 is output for odd-numbered gate lines and the gate signal ENB1 is output for even-numbered gate lines in the same manner. Finally, the gate signal ENB1 is output as the gate selection signal Gatem to the m-th gate line GLm in the period when the output signal out2 of the shift register circuit SR is at the voltage level of Hi.

In the gate selection circuit GSC, for example, each of the logical NOT circuits NOT1, NOT2, NOT3 and NOT4 is a CMOS inverter as shown in FIG. 6B, and is composed of a p-channel MOSFET and an n-channel MOSFET. The n-channel MOSFET and the p-channel MOSFET constituting each of the logical NOT circuits NOT1 to NOT4 are referred to as a second-a transistor T2a and a second-b transistor T2b, respectively. Each of the second-a transistor T2a and the second-b transistor T2b has a gate electrode, a source electrode, a drain electrode and a channel opposed to the gate electrode. The second-a transistor T2a and the second-b transistor T2b are generically called also as second transistors.

In the gate selection circuit GSC, the first-a transistor T1a, the first-b transistor T1b and the first-c transistor T1c constitute a circuit of the output section (gate switch circuit GSW) of the gate selection circuit GSC, and the second-a transistor T2a and the second-b transistor T2b constitute a circuit (shift register circuit SR) other than the output section. The gate switch circuit GSW serving as the circuit of the output section has a circuit configuration of a three-value drive of the first voltage VGH, the second voltage VGL and the third voltage GND. The shift register circuit SR serving as the circuit other than the output section has a circuit configuration of a two-value drive of the first voltage VGH and the second voltage VGL.

The first-a transistor T1a, the first-c transistor T1c and the second-a transistor T2a are n-channel MOSFETs, and when channel lengths of these transistors are compared, a channel length L1 of the first-a transistor T1a and the first-c transistor T1c of the output section is shorter than a channel length L2 of the second-a transistor T2a of the circuit other than the output section (see FIG. 10 to be described later).

The first-b transistor T1b and the second-b transistor T2b are p-channel MOSFETs, and when channel lengths of these transistors are compared, a channel length L1 of the first-b transistor T1b of the output section is shorter than a channel length L2 of the second-b transistor T2b of the circuit other than the output section (see FIG. 10 to be described later).

The channel length of each transistor corresponds to the gate electrode width. Further, when the p-channel MOSFET and the n-channel MOSFET are compared with each other in each transistor, the n-channel MOSFET is structurally larger in general, and thus has a longer channel length. This is because the current in an on state is larger in the n-channel MOSFET, and accordingly the size is also larger in the n-channel MOSFET. However, the p-channel MOSFET and the n-channel MOSFET are illustrated in the same size in the present embodiment.

<Gate Voltage Generation Circuit>

Figure 8A:
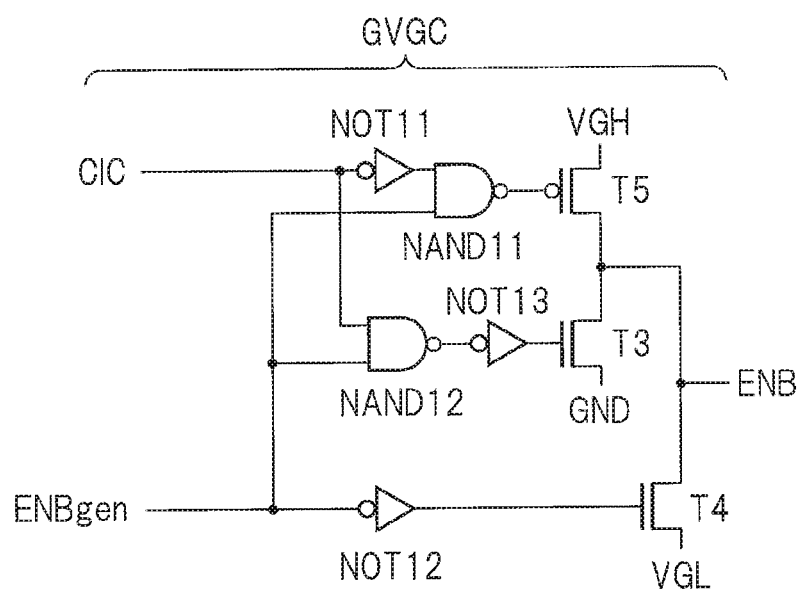
FIG. 8A is a circuit diagram showing an example of a gate voltage generation circuit of the embodiment.
Figure 8B:
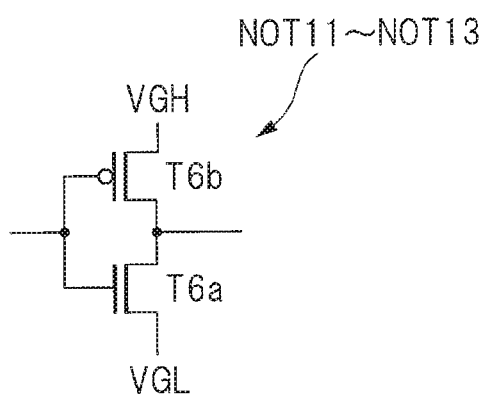
FIG. 8B is a circuit diagram showing an example of a gate voltage generation circuit of the embodiment.
Figure 9:
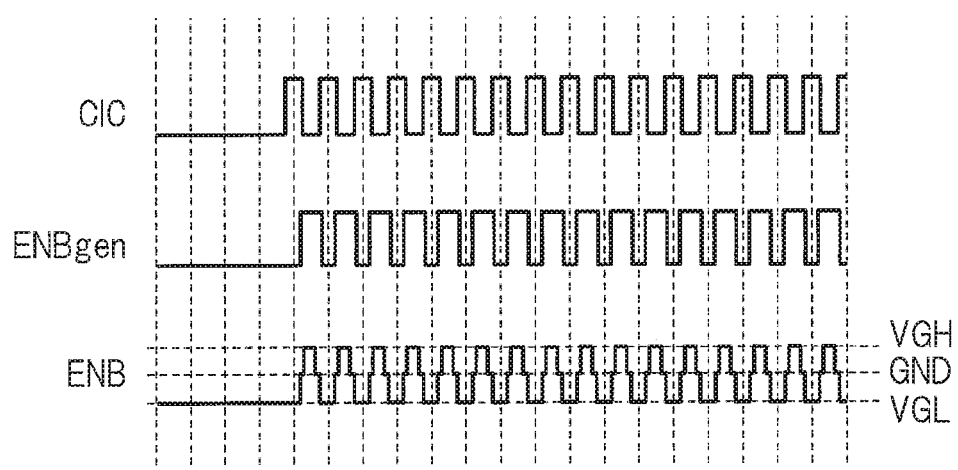
FIG. 9 is a timing chart showing an example of an operation of the gate voltage generation circuit of the embodiment.

Next, a circuit configuration and an operation of the gate voltage generation circuit will be described with reference to FIGS. 8A, 8B and 9. FIGS. 8A and 8B are circuit diagrams showing an example of the gate voltage generation circuit of the embodiment. FIG. 9 is a timing chart showing an example of the operation of the gate voltage generation circuit of the embodiment.

The gate voltage generation circuit GVGC is a circuit included in the gate driver GD and is a circuit for generating the gate signals ENB (ENB1 and ENB2) to be supplied to the gate selection circuit GSC. The gate voltage generation circuit GVGC is a circuit for generating a gate voltage (gate signal ENB) including the first voltage VGH, the second voltage VGL and the third voltage GND and supplying the gate voltage to the pixel transistor Trd of the display device. The first voltage VGH is a voltage for opening the pixel transistor Trd. The second voltage VGL is lower than the first voltage VGH and is a voltage for closing the pixel transistor Trd. The third voltage GND is an intermediate voltage between the first voltage VGH and the second voltage VGL.

The gate signal ENB to be supplied as a gate voltage to the pixel transistor Trd rises by way of the intermediate voltage (third voltage GND) when it rises from the second voltage VGL to the first voltage VGH. Further, the gate signal ENB falls by way of the intermediate voltage (third voltage GND) when it falls from the first voltage VGH to the second voltage VGL.

The gate voltage generation circuit GVGC is provided with a fifth transistor T5 connected to the first voltage line for supplying the first voltage VGH, a fourth transistor T4 connected to the second voltage line for supplying the second voltage VGL, a third transistor T3 connected to the third voltage line for supplying the third voltage GND, and a logical circuit for opening the gate of one transistor selected from the third transistor T3, the fourth transistor T4 and the fifth transistor T5. The logical circuit has three logical NOT circuits NOT11, NOT12 and NOT13 and two negative AND circuits NAND11 and NAND12.

The gate voltage generation circuit GVGC is a circuit which receives a grand period control signal CIC and a gate-on period control signal ENBgen as inputs, and outputs the gate signal ENB by performing the gate control of the third transistor T3, the fourth transistor T4 and the fifth transistor T5 by a logical operation of the logical NOT circuits NOT11, NOT12 and NOT13 and the negative AND circuits NAND11 and NAND12.

Among the third transistor T3, the fourth transistor T4 and the fifth transistor T5, the third transistor T3 and the fourth transistor T4 are n-channel MOSFETs and the fifth transistor T5 is a p-channel MOSFET. Each of the third transistor T3, the fourth transistor T4 and the fifth transistor T5 has a gate electrode, a source electrode, a drain electrode, and a channel opposed to the gate electrode.

In the fifth transistor T5, the gate electrode is connected to the output terminal of the negative AND circuit NAND11, the source electrode is connected to the first voltage VGH, and the drain electrode is connected to the drain electrode of the third transistor T3. In the third transistor T3, the gate electrode is connected to the output terminal of the logical NOT circuit NOT13, the source electrode is connected to the third voltage GND, and the drain electrode is connected to the drain electrode of the fifth transistor T5. In the fourth transistor T4, the gate electrode is connected to the output terminal of the logical NOT circuit NOT12, the source electrode is connected to the second voltage VGL, and the drain electrode is connected to the drain electrode of the third transistor T3. The drain electrodes of the third transistor T3, the fourth transistor T4 and the fifth transistor T5 serve as the output terminal of the gate signal ENB that is an output of the gate voltage generation circuit GVGC.

In the logical NOT circuit NOT11, the grand period control signal CIC is input to its input terminal and its output terminal is connected to one input terminal of the negative AND circuit NAND11. In the logical NOT circuit NOT12, the gate-on period control signal ENBgen is input to its input terminal and its output terminal is connected to the gate electrode of the fourth transistor T4. In the logical NOT circuit NOT13, the output terminal of the negative AND circuit NAND12 is connected to its input terminal and its output terminal is connected to the gate electrode of the third transistor T3.

In the negative AND circuit NAND11, the output terminal of the logical NOT circuit NOT11 is connected to one of its input terminals, the gate-on period control signal ENBgen is input to the other input terminal, and its output terminal is connected to the gate electrode of the fifth transistor T5. In the negative AND circuit NAND12, the grand period control signal CIC is input to one of its input terminals, the gate-on period control signal ENBgen is input to the other input terminal, and its output terminal is connected to the input terminal of the logical NOT circuit NOT13.

In the connection of the gate voltage generation circuit GVGC mentioned above, the gate signal ENB in response to input of the grand period control signal CIC and the gate-on period control signal ENBgen is output at the timing as shown in FIG. 9. The grand period control signal CIC is a signal for controlling the grand period of the gate signal ENB and is a pulse signal formed by repetition of the voltage levels of Hi and Lo. The gate-on period control signal ENBgen is a signal for controlling the gate-on period of the gate signal ENB, and is a pulse signal formed by repetition of the voltage levels of Hi and Lo.

When the grand period control signal CIC is at a voltage level of Hi and the gate-on period control signal ENBgen is at a voltage level of Lo, the gate signal ENB has the voltage level of the second voltage VGL. When the grand period control signal CIC is at a voltage level of Hi and the gate-on period control signal ENBgen is at a voltage level of Hi, the gate signal ENB has the voltage level of the third voltage GND. When the grand period control signal CIC is at a voltage level of Lo and the gate-on period control signal ENBgen is at a voltage level of Hi, the gate signal ENB has the voltage level of the first voltage VGH.

The gate signal ENB rises from the second voltage VGL to the first voltage VGH by way of the third voltage GND at the time of voltage rising, and it falls from the first voltage VGH to the second voltage VGL by way of the third voltage GND at the time of voltage falling. In this manner, the gate signal ENB rises by way of the third voltage GND corresponding to an intermediate voltage when the voltage rises from the second voltage VGL to the first voltage VGH. Further, the gate signal ENB falls by way of the third voltage GND corresponding to an intermediate voltage when the voltage falls from the first voltage VGH to the second voltage VGL.

For example, each of the logical NOT circuits NOT11, NOT12 and NOT13 is a CMOS inverter as shown in FIG. 8B, and is composed of a p-channel MOSFET and an n-channel MOSFET. The n-channel MOSFET and the p-channel MOSFET constituting each of the logical NOT circuits NOT11 to NOT13 are referred to as a sixth-a transistor T6a and a sixth-b transistor T6b, respectively. Each of the sixth-a transistor T6a and the sixth-b transistor T6b has a gate electrode, a source electrode, a drain electrode and a channel opposed to the gate electrode. The sixth-a transistor T6a and the sixth-b transistor T6b are generically called also as sixth transistors.

In the gate voltage generation circuit GVGC, the third transistor T3, the fourth transistor T4 and the fifth transistor T5 constitute a circuit of the output section of the gate voltage generation circuit GVGC, and the sixth-a transistor T6a and the sixth-b transistor T6b constitute a circuit other than the output section. The circuit of the output section has a circuit configuration of a three-value drive of the first voltage VGH, the second voltage VGL and the third voltage GND. The circuit other than the output section has a circuit configuration of a two-value drive of the first voltage VGH and the second voltage VGL.

The third transistor T3, the fourth transistor T4 and the sixth-a transistor T6a are n-channel MOSFETs, and when channel lengths of these transistors are compared, a channel length L3 of the third transistor T3 and the fourth transistor T4 of the output section is shorter than a channel length L6 of the sixth-a transistor T6a of the circuit other than the output section (see FIG. 10 to be described later).

In addition, the fifth transistor T5 and the sixth-b transistor T6b are p-channel MOSFETs, and when channel lengths of these transistors are compared, a channel length L3 of the fifth transistor T5 of the output section is shorter than a channel length L6 of the sixth-b transistor T6b of the circuit other than the output section (see FIG. 10 to be described later).

<Layout of Gate Selection Circuit and Gate Voltage Generation Circuit>

Figure 11:
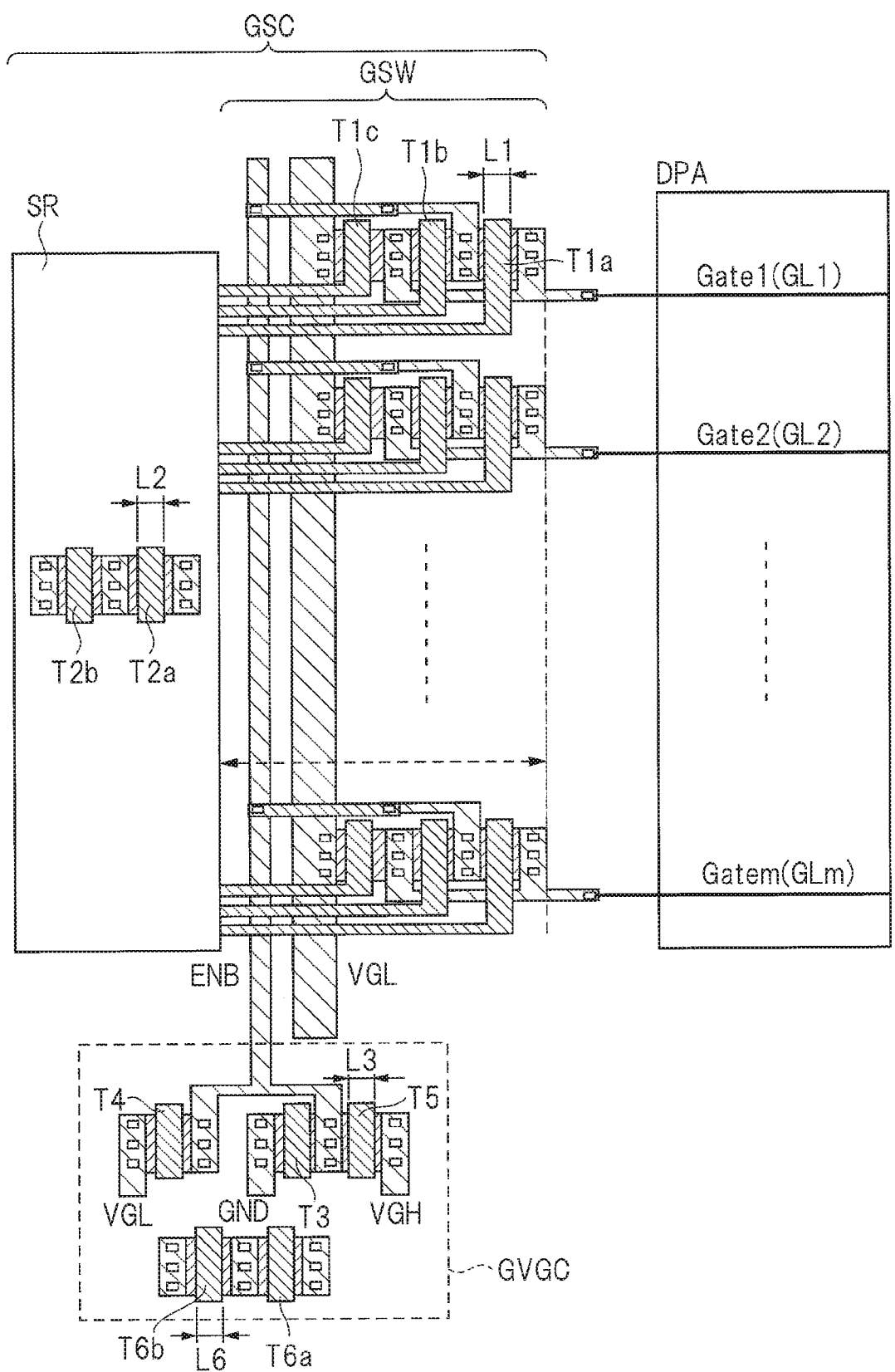
FIG. 11 is a layout diagram showing an example of a gate selection circuit and a gate voltage generation circuit of a comparative example of the embodiment.
Figure 12:
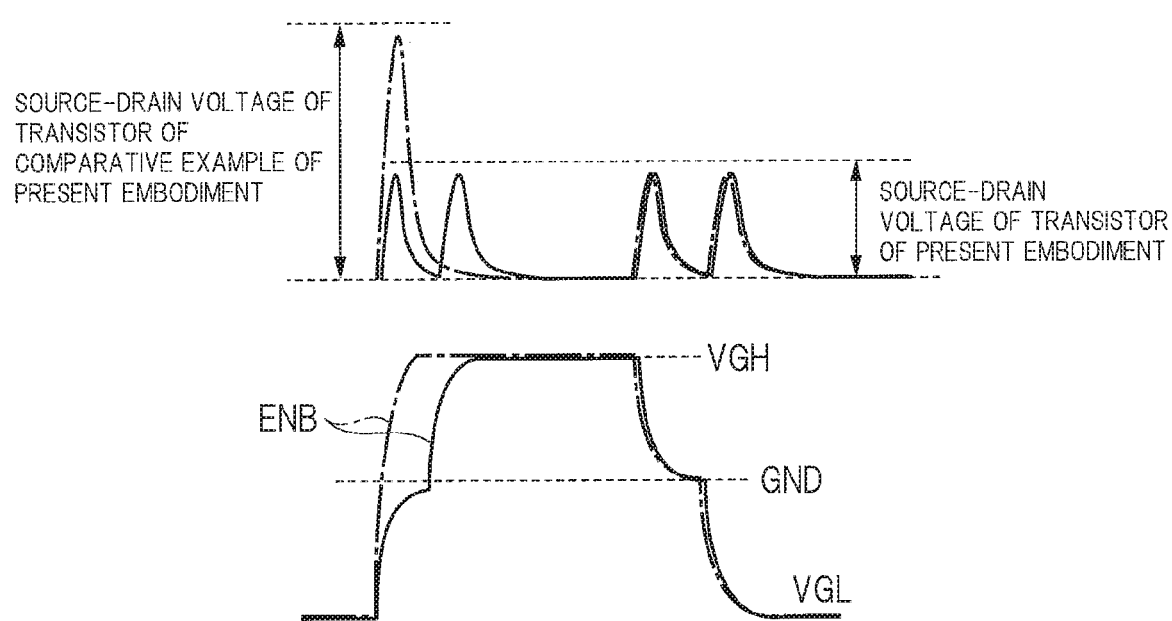
FIG. 12 is an explanatory diagram for illustrating comparison of a breakdown voltage for the voltage applied between the source and drain of a transistor in the embodiment and the comparative example of the embodiment.
Figure 13A:
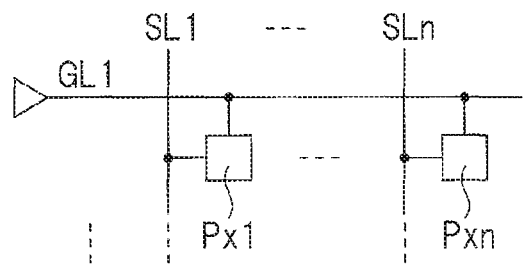
FIG. 13A is an explanatory diagram for illustrating compensation of in-plane distribution by a feed-through voltage of a pixel at the time of voltage falling in a gate line in the embodiment.
Figure 13B:
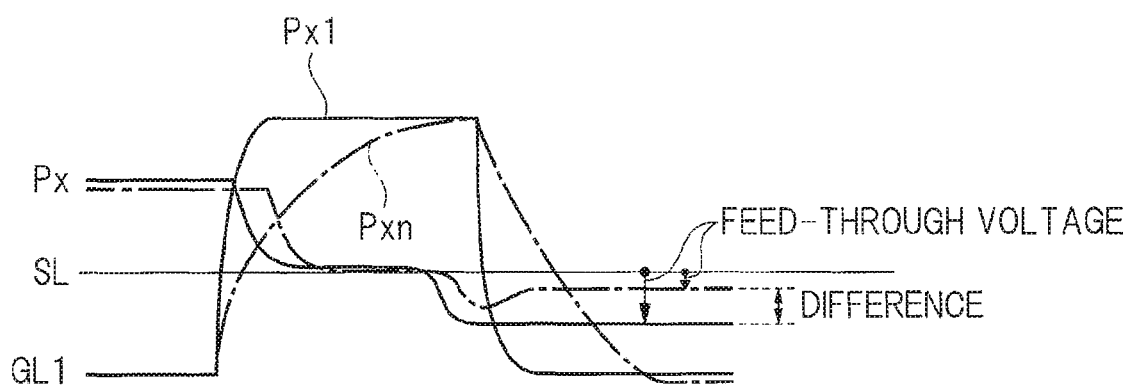
FIG. 13B is an explanatory diagram for illustrating compensation of in-plane distribution by a feed-through voltage of a pixel at the time of voltage falling in a gate line in the embodiment.
Figure 13C:
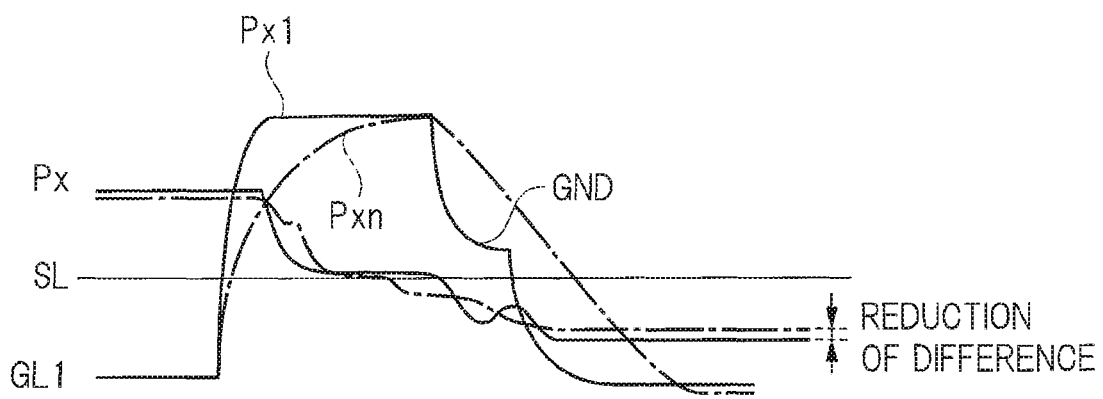
FIG. 13C is an explanatory diagram for illustrating compensation of in-plane distribution by a feed-through voltage of a pixel at the time of voltage falling in a gate line in the embodiment.

Next, the layout of the gate selection circuit and the gate voltage generation circuit will be described with reference to FIG. 10 to FIG. 13A-13C. FIG. 10 is a layout diagram showing an example of the gate selection circuit and the gate voltage generation circuit of the embodiment. FIG. 11 is a layout diagram illustrating an example of the gate selection circuit and the gate voltage generation circuit of a comparative example of the embodiment. FIG. 12 is an explanatory diagram for illustrating the comparison of a breakdown voltage for the voltage applied between the source and drain of a transistor. FIGS. 13A-13C are explanatory diagrams for illustrating the compensation of in-plane distribution by a feed-through voltage of the pixel at the time of voltage falling in the gate line.

As described above, in the gate selection circuit GSC of the present embodiment, the gate signals ENB (ENB1 and ENB2) are pulse signals which rise from the second voltage VGL to the first voltage VGH by way of the third voltage GND corresponding to an intermediate voltage at the time of rising, and fall from the first voltage VGH to the second voltage VGL by way of the third voltage GND corresponding to an intermediate voltage at the time of falling.

With this configuration, as shown by a solid line in FIG. 12 (the one-dot chain line shows a comparative example of the present embodiment), the gate signal ENB rises and falls by way of the intermediate voltage without fail, and thus the source-drain voltage applied to the first-a transistor T1a, the first-b transistor T1b and the first-c transistor T1c of the output section of the gate selection circuit GSC that directly drives the gate line GL can be reduced by half. As a result, a transistor of a low breakdown voltage for the voltage applied between the source and drain can be employed for the first-a transistor T1a, the first-b transistor T1b and the first-c transistor T1c of the output section. The transistor of a low breakdown voltage has advantage of being able to reduce its area and enhance its current capability.

On the other hand, a full amplitude from the second voltage VGL to the first voltage VGH or from the first voltage VGH to the second voltage VGL is applied to the second-a transistor T2a and the second-b transistor T2b of the shift register circuit SR for driving the first-a transistor T1a, the first-b transistor T1b and the first-c transistor T1c of the output section, and therefore, a transistor whose breakdown voltage for the voltage applied between the source and drain is the same as that of the transistor of the conventional art is used for the second-a transistor T2a and the second-b transistor T2b.

As described above, in the gate selection circuit GSC of the present embodiment, transistors whose breakdown voltage is the same as that of the conventional art are adopted for the second-a transistor T2a and the second-b transistor T2b of the shift register circuit SR, while transistors of a low breakdown voltage can be adopted for the first-a transistor T1a, the first-b transistor T1b and the first-c transistor T1c of the output section.

In contrast, in the gate selection circuit GSC of a comparative example of the present embodiment, as shown in FIG. 11, transistors whose breakdown voltage is the same as that of the conventional art are used also for the first-a transistor T1a, the first-b transistor T1b and the first-c transistor T1c of the output section in addition to the second-a transistor T2a and the second-b transistor T2b in the shift register circuit SR, and thus, the area has been increased.

In FIG. 1i, for example, when transistors of the n-channel MOSFET are compared with each other, the channel length L1 of the first-a transistor T1a and the first-c transistor T1c of the output section is the same as the channel length L2 of the second-a transistor T2a of the circuit other than the output section. Further, when transistors of the p-channel MOSFET are compared with each other, the channel length L1 of the first-b transistor T1b of the output section is the same as the channel length L2 of the second-b transistor T2b of the circuit other than the output section.

Figure 10:
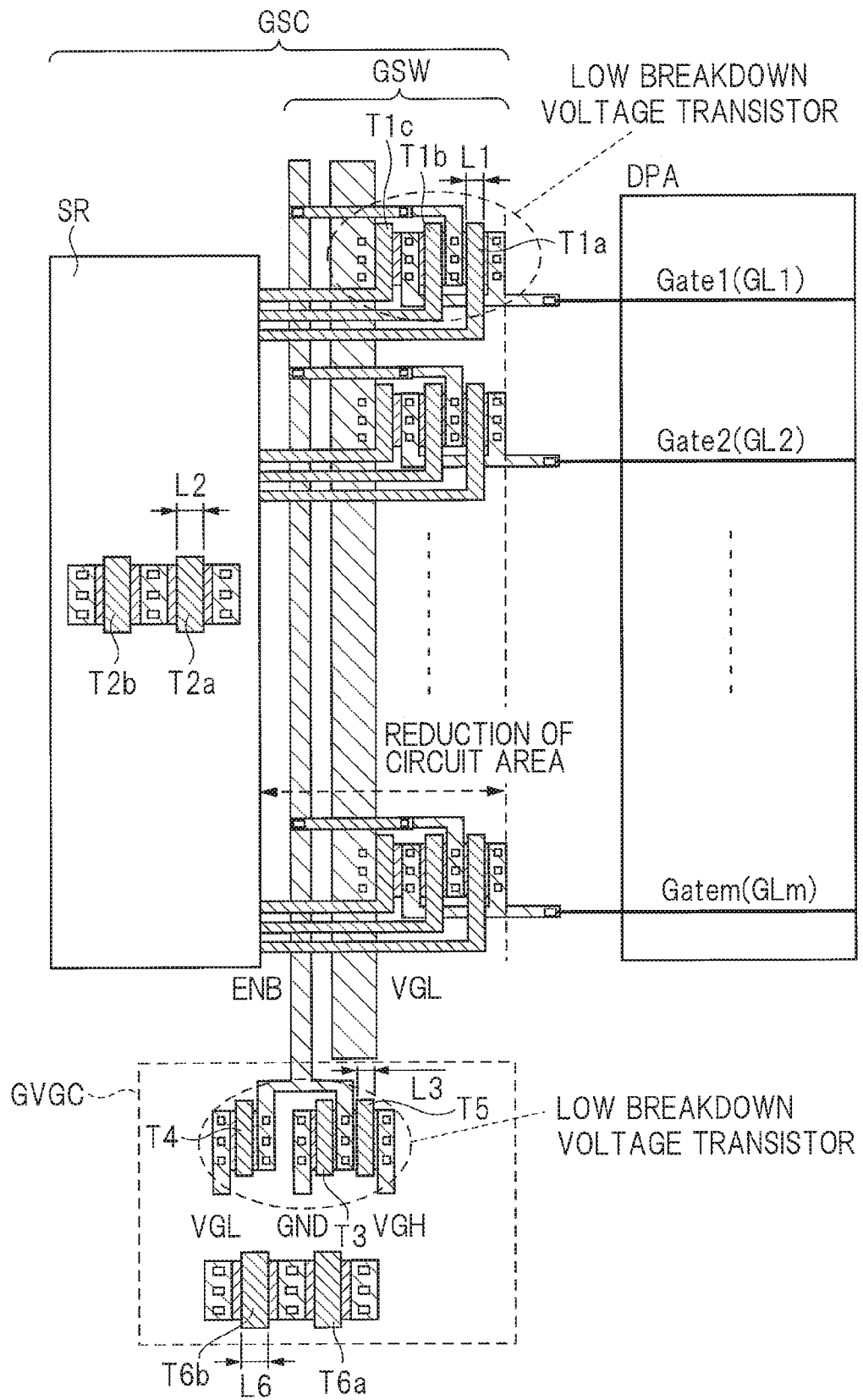
FIG. 10 is a layout diagram showing an example of the gate selection circuit and the gate voltage generation circuit of the embodiment.

In the gate selection circuit GSC of the present embodiment, since transistors of a low breakdown voltage can be adopted for the first-a transistor T1a, the first-b transistor T1b and the first-c transistor T1c of the output section, the circuit area can be reduced as shown in FIG. 10 as compared with the comparative example of the present embodiment.

In FIG. 10, for example, when transistors of the n-channel MOSFET are compared with each other, the channel length L1 of the first-a transistor T1a and the first-c transistor T1c of the output section is shorter than the channel length L2 of the second-a transistor T2a of the circuit other than the output section. To be specific, the channel length L1 of the first-a transistor T1a and the first-c transistor T1c of the output section is not more than two-thirds and not less than one-quarter of the channel length L2 of the second-a transistor T2a of the circuit other than the output section. Further, for example, when transistors of the p-channel MOSFET are compared with each other, the channel length L1 of the first-b transistor T1b of the output section is shorter than the channel length L2 of the second-b transistor T2b of the circuit other than the output section. To be specific, the channel length L1 of the first-b transistor T1b of the output section is not more than two-thirds and not less than one-quarter of the channel length L2 of the second-b transistor T2b of the circuit other than the output section.

Also in the gate voltage generation circuit GVGC, the gate signal ENB rises from the second voltage VGL to the first voltage VGH by way of the third voltage GND corresponding to an intermediate voltage at the time of rising, and falls from the first voltage VGH to the second voltage VGL by way of the third voltage GND corresponding to an intermediate voltage at the time of falling.

Hence, the gate signal ENB rises and falls by way of the intermediate voltage without fail, and thus the source-drain voltage applied to the third transistor T3, the fourth transistor T4 and the fifth transistor T5 of the output section of the gate voltage generation circuit GVGC can be reduced by half. As a result, transistors of a low breakdown voltage for the voltage applied between the source and drain can be employed for the third transistor T3, the fourth transistor T4 and the fifth transistor T5 of the output section. The transistor with a low breakdown voltage has advantage of being able to reduce its area and enhance its current capability.

On the other hand, a full amplitude from the second voltage VGL to the first voltage VGH or from the first voltage VGH to the second voltage VGL is applied to the sixth-a transistor T6a and the sixth-b transistor T6b of the logical circuit for driving the third transistor T3, the fourth transistor T4 and the fifth transistor T5 of the output section, and therefore, a transistor whose breakdown voltage for the voltage applied between the source and drain is the same as that of the transistor of the conventional art is used for the sixth-a transistor T6a and the sixth-b transistor T6b.

As described above, in the gate voltage generation circuit GVGC of the present embodiment, transistors whose breakdown voltage is the same as that of the conventional art are adopted for the sixth-a transistor T6a and the sixth-b transistor T6b of the logical circuit, while transistors of a low breakdown voltage can be adopted for the third transistor T3, the fourth transistor T4 and the fifth transistor T5 of the output section.

In contrast, in the gate voltage generation circuit GVGC of a comparative example of the present embodiment, as shown in FIG. 11, transistors whose breakdown voltage is the same as that of the conventional art are used also for the third transistor T3, the fourth transistor T4 and the fifth transistor T5 of the output section in addition to the sixth-a transistor T6a and the sixth-b transistor T6b of the logical circuit, and thus, the area has been increased.

In FIG. 11, for example, when transistors of the n-channel MOSFET are compared with each other, the channel length L3 of the third transistor T3 and the fourth transistor T4 of the output section is the same as the channel length L6 of the sixth-a transistor T6a of the circuit other than the output section. For example, when transistors of the p-channel MOSFET are compared with each other, the channel length L3 of the fifth transistor T5 of the output section is the same as the channel length L6 of the sixth-b transistor T6b of the circuit other than the output section.

In the gate voltage generation circuit GVGC of the present embodiment, since transistors of a low breakdown voltage can be adopted for the third transistor T3, the fourth transistor T4 and the fifth transistor T5 of the output section, the circuit area can be reduced as shown in FIG. 10 as compared with the comparative example of the present embodiment.

In FIG. 10, for example, when transistors of the n-channel MOSFET are compared with each other, the channel length L3 of the third transistor T3 and the fourth transistor T4 of the output section is shorter than the channel length L6 of the sixth-a transistor T6a of the circuit other than the output section. To be specific, the channel length L3 of the third transistor T3 and the fourth transistor T4 of the output section is not more than two-thirds and not less than one-quarter of the channel length L6 of the sixth-a transistor T6a of the circuit other than the output section. Further, for example, when transistors of the p-channel MOSFET are compared with each other, the channel length L3 of the fifth transistor T5 of the output section is shorter than the channel length L6 of the sixth-b transistor T6b of the circuit other than the output section. To be specific, the channel length L3 of the fifth transistor T5 of the output section is not more than two-thirds and not less than one-quarter of the channel length L6 of the sixth-b transistor T6b of the circuit other than the output section.

As described above, the gate signal ENB in the present embodiment is a pulse signal which falls from the first voltage VGH to the second voltage VGL by way of the third voltage GND corresponding to an intermediate voltage at the time of falling. A technique similar to this is described in Patent Document 2 mentioned above. Patent Document 2 describes a technique in which a signal supplied to a gate line GL falls by way of an intermediate voltage at the time of the voltage falling from a high voltage to a low voltage. The purpose thereof is to compensate in-plane distribution by a feed-through voltage of the pixel during the voltage falling in the gate line.

For example, in a configuration in which the plurality of pixels Px are arranged in matrix at the intersections of each gate line GL and each source line SL and a voltage is supplied to each gate line GL (the gate line GL1 is illustrated for example) from one side as shown in FIG. 13A, a difference in the feed-through voltage to the potential of the source line SL occurs between a pixel Px1 of the near end and a pixel Pxn of the far end connected to the gate line GL.

FIG. 13B shows a technique in which the voltage does not fall from a high voltage to a low voltage by way of an intermediate voltage at the time of falling of the signal supplied to the gate line GL. In this case, a difference in the feed-through voltage to the potential of the source line SL is large between the pixel Px1 of the near end and the pixel Pxn of the far end. In contrast, in a technique in which the voltage falls from a high voltage to a low voltage by way of an intermediate voltage (GND) at the time of falling of the signal supplied to the gate line GL, the difference in the feed-through voltage to the potential of the source line SL between the pixel Px1 of the near end and the pixel Pxn of the far end can be reduced as shown in FIG. 13C. Since this difference affects the in-plane distribution of the voltage to be supplied to the gate line GL, it is desirable to reduce the difference.

Also in the gate selection circuit GSC and the gate voltage generation circuit GVGC of the present embodiment, in-plane distribution by a feed-through voltage of the pixel at the time of voltage falling in the gate line can be compensated by allowing the voltage to fall by way of the third voltage GND corresponding to an intermediate voltage during the voltage falling from the first voltage VGH as a high voltage to the second voltage VGL as a low voltage at the time of falling of the gate signal ENB supplied to the gate line GL. Thus, the gate selection circuit GSC and the gate voltage generation circuit GVGC of the present embodiment are suitable for a configuration of the one-side power feeding in which a voltage is supplied to the gate line GL of the pixel transistor Trd from one side.

Modification Example

A modification example of the display device of the present embodiment will be described. In the above-mentioned embodiment, the circuit of the output section of the gate selection circuit GSC and the circuit of the output section of the gate voltage generation circuit GVGC have circuit configurations of a three-value drive of the first voltage VGH, the second voltage VGL and the third voltage GND serving as an intermediate voltage between these voltages, but circuit configurations of a four-value drive can also be employed.

In this case, in the relationship in voltage level of the voltage VGL2<the voltage VGL1<the voltage VGH1<the voltage VGH2, the pulse signal rises from the voltage VGL2 to the voltage VGH2 by way of the voltages VGL1 and VGH1 in the rising of the gate signal ENB, and falls from the voltage VGH2 to the voltage VGL2 by way of the voltages VGH1 and VGL1 in the falling of the gate signal ENB.

Thus, the circuit of the output section of the gate selection circuit GSC and the circuit of the output section of the gate voltage generation circuit GVGC of the modification example can adopt a transistor of a further lower breakdown voltage, and therefore, can further reduce the circuit area compared with the above-mentioned embodiment.

Effects of Embodiment

According to the display device of the present embodiment described above, a transistor of a low breakdown voltage for the voltage applied between the source and drain is employed for a transistor of the output section whose impact on the frame is large in the circuit of the gate driver GD, so that the transistor can be downsized and the circuit area can be reduced. Further, in the display region of the display device, higher resolution of the display image can be achieved by arranging more pixels. The time necessary for the falling in the gate line compresses other timing margins due to the higher resolution of the display image, but the present embodiment also has an effect to reduce the time necessary for the falling in the gate line. As a result, according to the display device of the present embodiment, the time necessary for the falling in the gate line GL can be reduced while reducing the size of the frame by downsizing the circuit area.

In the foregoing, the invention made by the inventor of the present invention has been concretely described based on the embodiments. However, it is needless to say that the present invention is not limited to the foregoing embodiments and various modifications and alterations can be made within the scope of the present invention.

The present invention can be effectively applied especially to a gate voltage generation circuit for supplying a gate voltage to a pixel transistor of a display device, a transistor substrate provided with this gate voltage generation circuit and a display device provided with this transistor substrate.

Further, in the above-mentioned embodiment, a case of a liquid crystal display device has been illustrated as the disclosed example, but any flat panel display devices such as an organic EL display device, other self-luminous display devices, and an electronic paper display device having electrophoretic elements can also be cited as other application examples. Needless to say, the embodiment is applicable to devices of small and middle sizes up to a large size without any particular limitation.

A person having an ordinary skill in the art can make various modification examples and correction examples within a scope of the idea of the present invention, and it is interpreted that the modification examples and the correction examples also belong to the scope of the present invention. For example, the examples obtained by performing addition or elimination of components or design change or the examples obtained by performing addition or reduction of process or condition change to the embodiment described above by a person having an ordinary skill in the art are also included in the scope of the present invention as long as they include the gist of the present invention.

Other functions and effects brought from the aspects described in the present embodiment, which are obvious or can be appropriately anticipated by a person having an ordinary skill in the art from the description of the present specification, are interpreted to be brought from the present invention as a matter of course.

What is claimed:

1. A display device comprising a gate voltage generation circuit,
   wherein the gate voltage generation circuit includes a first transistor, a second transistor, a third transistor, and a CMOS inverter having n-channel portion and p-channel portion, wherein
   the third transistor is a p-channel MOSFET,
   the third transistor has a first channel length,
   the p-channel portion of CMOS inverter has a second channel length,
   the first channel length is shorter than the second channel length,
   the first to third transistor connects to an output line,
   the output line has branch shape composed of a first branch portion and a second branch portion, the first branch portion is connected to an output portion of the first transistor,
the second branch portion is connected to an output portion of the second transistor and the third transistor, and
the output portion of the second transistor is same place as the output portion of the third transistor.

2. The display device according to claim 1, wherein
the first transistor and the second transistor are n-channel MOSFET,
each of the first transistor and the second transistor has the first channel length, and
the n-channel portion of the CMOS inverter has the second channel length.

3. The display device according to claim 1, wherein
an input portion of the first transistor connects to a low voltage line,
an input portion of the second transistor connects to a grand voltage line,
an input portion of the third transistor connects to the high voltage line,
an input portion of the p-channel portion of the CMOS inverter connects to the high voltage line, and
an input portion of the n-channel portion of the CMOS inverter connects to the low voltage line.

4. The display device according to claim 3, further comprising a gate selection circuit including a gate switch circuit and a shift register circuit, wherein
the gate switch circuit has a n-channel MOSFET,
the shift register circuit has a CMOS inverter,
the CMOS inverter of the shift register has a n-channel portion and a p-channel portion,
the n-channel MOSFET of the gate switch has a third channel length,
the n-channel portion of the CMOS inverter of the shift register has a fourth channel length, and
the third channel length is shorter than the fourth channel length.

5. The display device according to claim 4, wherein
the third channel length is shorter than the second channel length.

6. A transistor substrate comprising a gate voltage generation circuit,
wherein the gate voltage generation circuit includes a first transistor, a second transistor, a third transistor, and a CMOS inverter having n-channel portion and p-channel portion, wherein
the third transistor is a p-channel MOSFET,
the third transistor has a first channel length,
the p-channel portion of CMOS inverter has a second channel length,
the first channel length is shorter than the second channel length,
the first to third transistor connects to an output line,
the output line has branch shape composed of a first branch portion and a second branch portion,
the first branch portion is connected to an output portion of the first transistor,
the second branch portion is connected to an output portion of the second transistor and the third transistor, and
the output portion of the second transistor is same place as the output portion of the third transistor.

7. The transistor substrate according to claim 6, wherein
the first transistor and the second transistor are n-channel MOSFET,
each of the first transistor and the second transistor has the first channel length, and
the n-channel portion of the CMOS inverter has the second channel length.

8. The transistor substrate according to claim 6, wherein
an input portion of the first transistor connects to a low voltage line,
an input portion of the second transistor connects to a grand voltage line,
an input portion of the third transistor connects to the high voltage line,
an input portion of the p-channel portion of the CMOS inverter connects to the high voltage line, and
an input portion of the n-channel portion of the CMOS inverter connects to the low voltage line.

9. A gate voltage generation circuit comprising;
a p-channel MOSFET;
a first n-channel MOSFET;
a second n-channel MOSFET;
a first NOT circuit;
a second NOT circuit;
a third NOT circuit;
a first negative AND circuit; and
a second negative AND circuit,
wherein an input terminal of the p-channel MOSFET connects to a high voltage line, an output terminal of the p-channel MOSFET connects to a gate signal line, and a gate of the p-channel MOSFET connects to an output terminal of the negative AND circuit,
wherein an input terminal of the first n-channel MOSFET connects to a low voltage line, an output terminal of the n-channel MOSFET connects to the gate signal line, and a gate of the n-channel MOSFET connects to an output terminal of the second NOT circuit,
wherein an input terminal of the second n-channel MOSFET connects to an intermediate voltage line, an output terminal of the second n-channel MOSFET connects to the gate signal line, and a gate of the second n-channel MOSFET connects to an output terminal of the third NOT circuit,
wherein an output terminal of the first NOT circuit connects to a first input terminal of the first negative AND circuit, and
wherein an output terminal of the second negative AND circuit connects to an input terminal of the third NOT circuit.

10. The gate voltage generation circuit according to claim 9, wherein
an input terminal of the first NOT circuit connects to a grand period control line, and
wherein a second input terminal of the first negative AND circuit connects to a gate-on period control signal line.

11. The gate voltage generation circuit according to claim 10,
wherein a first input terminal of the second negative AND circuit connects to the grand period control signal line, and
wherein a second input terminal of the second negative AND circuit connects to the gate-on period control signal line.

12. The gate voltage generation circuit according to claim 11,
wherein each of the first to third NOT circuit is a CMOS inverter.

* * * * *